United States Patent [19]

Izumida et al.

[11] Patent Number: 4,617,634

[45] Date of Patent: Oct. 14, 1986

[54] ARTIFICIAL SATELLITE ATTITUDE CONTROL SYSTEM

[75] Inventors: Kiichiro Izumida; Ritaroh Kasai, both of Kanagawa, Japan

[73] Assignee: Mitsubishi Denki Kabushiki Kaisha, Tokyo, Japan

[21] Appl. No.: 606,660

[22] Filed: May 3, 1984

[30] Foreign Application Priority Data

Jun. 28, 1983 [JP] Japan .................................. 58-116372
Jun. 30, 1983 [JP] Japan .................................. 58-118708

[51] Int. Cl.$^4$ .......................... B64G 1/36; B64G 1/28
[52] U.S. Cl. .................................. 364/455; 364/434; 364/453; 244/164; 244/171
[58] Field of Search ............... 364/455, 434, 459, 559, 364/566; 244/164, 166, 171, 176; 318/582; 343/352, 355, 356, 357; 356/141, 144, 146, 152

[56] References Cited

U.S. PATENT DOCUMENTS

| | | | |
|---|---|---|---|
| 3,088,697 | 5/1963 | Cutler | 343/555 |
| 3,137,853 | 6/1964 | Cutler | 343/555 |
| 3,310,982 | 3/1967 | Yamron | 364/455 |
| 3,439,427 | 4/1969 | Gow | 364/455 |
| 3,866,025 | 2/1975 | Cavanagh | 364/434 |
| 3,992,106 | 11/1976 | Averbach | 356/141 |
| 4,012,018 | 3/1977 | Lorell et al. | 244/165 |
| 4,071,211 | 1/1978 | Nahlfelder | 364/434 |
| 4,084,773 | 4/1978 | Schmidt, Jr. et al. | 244/166 |
| 4,134,681 | 1/1979 | Elmer | 364/434 |
| 4,388,646 | 6/1983 | Strother | 364/517 |
| 4,409,658 | 10/1983 | Beusse | 364/424 |

Primary Examiner—Felix D. Gruber
Assistant Examiner—Thomas G. Black
Attorney, Agent, or Firm—Bernard, Rothwell & Brown

[57] ABSTRACT

A system for controlling an attitude of an artificial satellite to decide the present attitude of the satellite on a spatial coordinate and angular velocities of rotation about body axes of the satellite, by the use of inertial sensors and star sensors, to calculate an objective attitude of the satellite on the basis of the present attitude information, the angular velocities of rotation about the body axes and orbit information received from a ground station so that the attitude of the satellite and the changing rate thereof are controlled simultaneously.

7 Claims, 20 Drawing Figures

ARTIFICIAL SATELLITE ATTITUDE CONTROL SYSTEM

FIELD OF THE INVENTION

The present invention relates to a system for an attitude control of an artificial satellite and more particularly to a system for the attitude control of an artificial satellite by detecting position of a fixed star.

BACKGROUND OF THE INVENTION

The attitude of an artificial satellite is controlled on the basis of information provided by an onboard gyro package or positional information of the earth or the sun.

An arrangement for controlling such an attitude in the prior art has been discussed by R. L. Farrenkopf, entitled "Generalized Results for Precision Attitude Reference Systems Using Gyros", AIAA paper, No. 74-903, 1974, wherein a filter algorithm which provides high precision attitude determination on an assumption that the observed values and catalog values of a fixed star is given by some means and the initial attitude of the satellite is predetermined.

Further, techniques are described by R. J. Jude, entitled "System Study of an Internal Attitude-Measurement System for Earth Pointing Satellites", Proceedings of AOCS Conference, Filed in Noordwijk, 3-6, October, 1977 (ESA SP-128. November 1977), wherein a decision is made on the deviation between body axis of the satellite to be directed to the earth and the direction of the center of the earth on the basis of the estimated values of star vector based on objective attitude calculated by the use of orbit data.

Furthermore, an arrangement for maintaining the high precision of the attitude determination system and, in particular, method for formating filters are described by K. Yong, et al., entitled "Realtime Precision Attitude Determination System (RETPAD) for Highly Maneuverable Spacecrafts" AIAA G&C Conf., p48, (7-9 August, 1978).

A conventional attitude control system of such an art which has been developed previously is shown in FIG. 1A, in which respective directions of the fields of view of a first and second earth sensor are rotated about axes $X_B$ and $-X_B$ respectively to detect the pitch deviation $\theta$ and the roll deviation $\phi$ between the body axes ($Y_B$, $Z_B$) and ($X_B$, $Z_B$) and a direction of the center of the earth E. More particularly, the roll deviation $\phi$ is detected, as shown in FIG. 1C, on the basis of the difference between the earth scanning widths of the first and second earth sensors, while the pitch deviation $\theta$ is detected on the basis of the deviation of the reference pulse from the center of the scanning pulse, as shown in FIG. 1D. As shown in FIG. 1B, the attitude of the satellite is controlled so that those deviations are reduced to zero.

However, it is known that the detecting output from the earth sensor is subject to the influence of the variation of the atmosphere in radiation, and hence it has been difficult to control the attitude of the satellite in high precision. Furthermore, since only the deviation of the attitude is the subject of attitude compensation control in such an attitude control system, it has been difficult to control the attitude changing speed so that the speed will coincide with a reference value simultaneously with the control of the attitude itself.

SUMMARY OF THE INVENTION

Accordingly, it is an object of the present invention to provide an artificial satellite attitude control system of improved attitude control accuracy.

It is another object of the present invention to provide an artificial satellite attitude control system capable of controlling both the attitude and the attitude changing speed of a satellite simultaneously.

According to the present invention, the inertial sensor and the star sensor are employed to decide the existing attitude of a satellite on a spatial coordinate system and in-flight measurements of the angular speed of rotation about the body axes and orbital information received from a ground station are employed to calculate the objective attitude of the satellite and both the attitude of the satellite and the attitude changing speed of the satellite are controlled simultaneously so that the attitude of the satellite coincides with the objective attitude.

DESCRIPTION OF THE PREFERRED EMBODIMENTS

Figure 2:
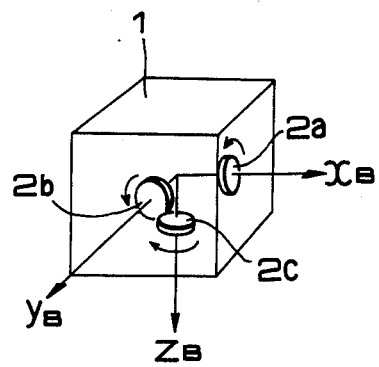
FIG. 2 is a diagram illustrating the relation between axes X, Y and Z and the corresponding sensors.

Preferred embodiments of the present invention will be described in detail hereinafter in connection with the accompanying drawings. FIG. 2 shows the disposition of wheels on the satellite body coordinate axes. The wheels 2a, 2b and 2c are onboard torque generators of a satellite 1, disposed with their axes of rotation in alignment with the satellite body coordinate axes $X_B$, $Y_B$ and $Z_B$ respectively. The revolving rates of the wheels 2a, 2b and 2c increase or decrease when the voltage applied or the current supplied thereto is increased or decreased respectively. The satellite 1 is controlled about the axes $X_B$, $Y_B$ and $Z_B$ by the reaction against electromagnetic force resulting from the variation of the revolving rates of the wheels 2a, 2b and 2c.

Figure 3:
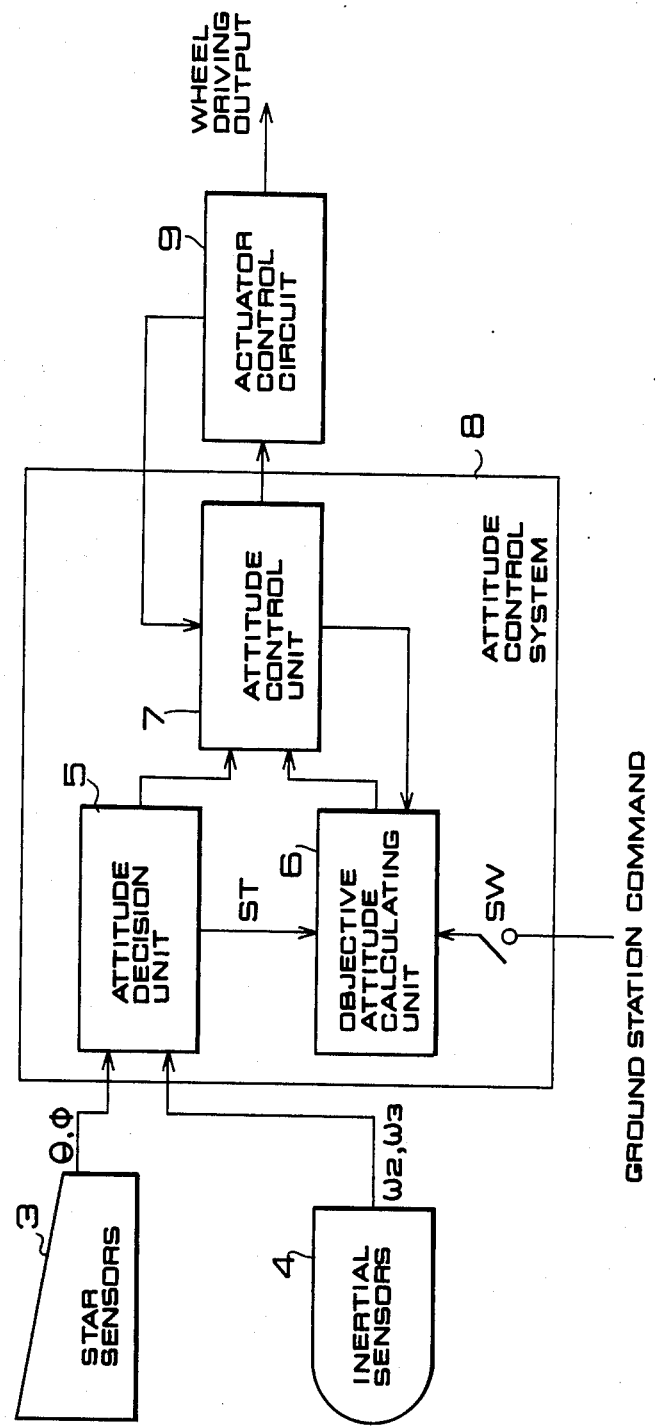
FIG. 3 is a block diagram showing the general constitution of a first embodiment of the satellite attitude control system according to the present invention.

FIG. 3 is a block diagram showing the general constitution of a satellite attitude control system according to the present invention.

An attitude decision unit 5 receives data from a star sensor 3 and inertial sensors 4 and processes the received data to calculate the attitude of the satellite. An objective attitude calculating unit 6 receives and reads in command signals received from a ground station, namely, orbital information, periodically via a switch SW and calculates the conditions of the objective attitude, such as a unit vector along a direction toward the center of the earth relative to the satellite and the changing speed of the unit vector, by the use of the orbital information and operating information of a secondary propulsion system, such as a gas jet, which is fed back thereto from an attitude control unit 7. The attitude control unit 7 processes present attitude information from the decision unit 5, objective attitude status from the calculating unit 6 and the angular speed of rotation of the wheels given by an actuator control circuit 9 to provide a manipulated variable for attitude control.

Then, the actuator control circuit 9 receives the output signal from the attitude control system 8 and generates an analog voltage corresponding to the output signal to provide wheel outputs. The wheel outputs are applied to the wheels 2a, 2b and 2c to control the angular speed of rotation of each wheel, so that the attitude control of the satellite is attained.

Figure 4:
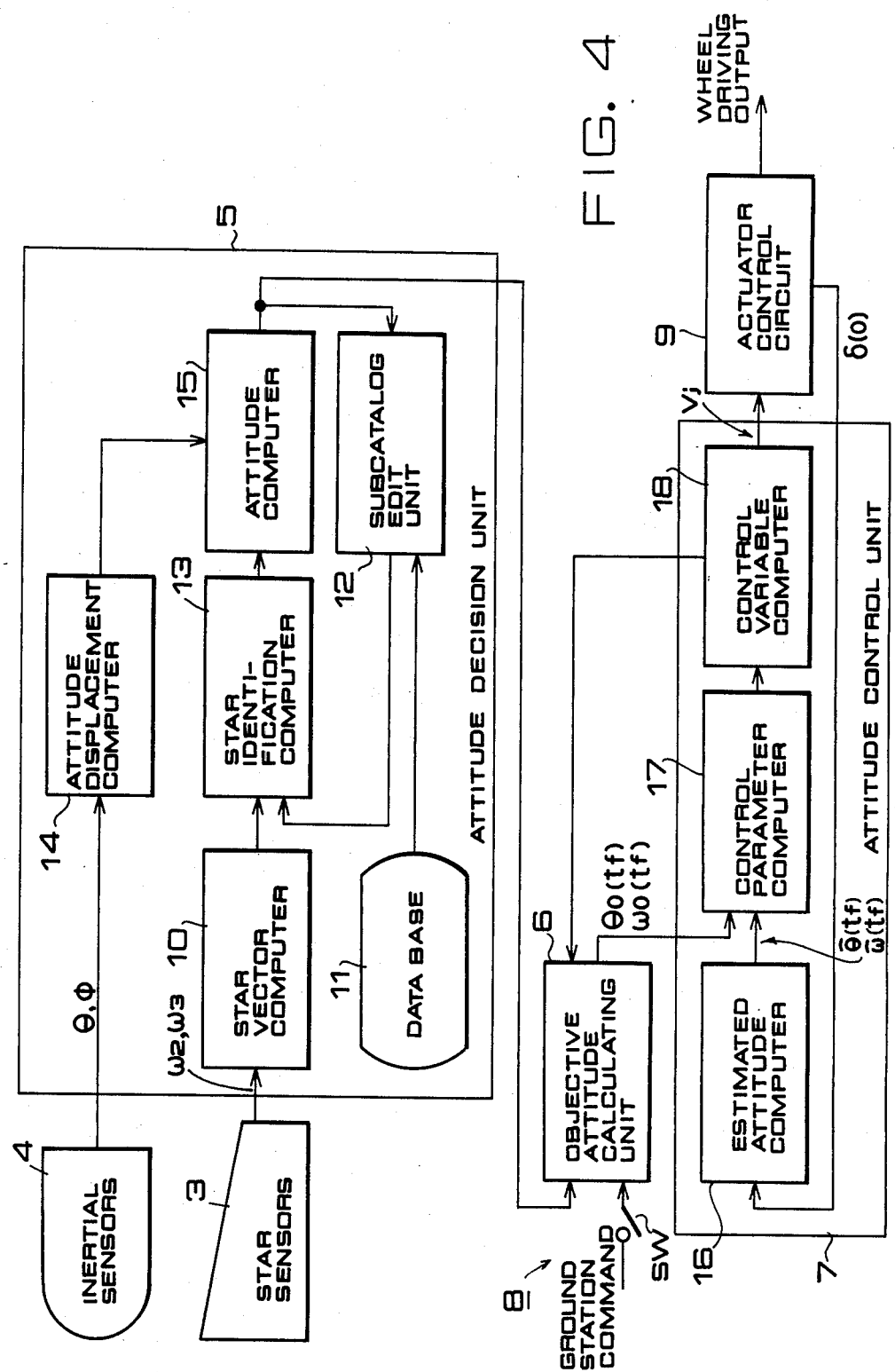
FIG. 4 is a detailed block diagram showing the constitution of the satellite attitude control system of FIG. 3.

FIG. 4 is a block diagram showing the constitution of the satellite attitude control system of FIG. 3 more concretely, wherein the unit 5 includes a star vector computer 10, a data base 11, a subcatalog edit unit 12, a star identification processor 13, an attitude displacement computer and an attitude computer 15. The control unit 7 includes an estimated attitude computer 16, a control parameter computer 17 and a control variable computer 18. The star vector computer 10 receives observed star coordinates ($y_i$, $z_i$), where "i" represents the number of observed star, within the field of view of the sensor as an input data and processes the same to calculate the unit vector $S_i(t_0)$ in the direction of the star on the coordinate system of the satellite body axes. The subcatalog edit unit 12 edits subcatalog $S_j^a$ ("j" represents the number of catalog star) on the basis of a star catalog contained in the data base 11. Although attitude information is necessary in this process, the estimated values of attitude provided in the data base, for instance, is employed as initial attitude information for the first edit processing. The star identification processor 13 determines a catalog star $S_{ij}^a$ corresponding to $S_i(t_0)$. The attitude displacement computer 14 calculates the variation $[\Delta C_B]_T$ in the attitude of the satellite during a time from a star observation time $t_0$ to a time $t_0+T$ (T=attitude calculation interval) on the basis of measured angular velocities $\omega hd\ l(t)$ (l=1, 2 or 3) of rotation about the body axes of the satellite measured by the inertial sensors 4. The attitude computer 15 calculates the present attitude $[_BC_I]_t$ at a time $t_0+T$ on the basis of $[S_i(t_0), S_{ij}^a]$ and $[C_B]_T$ as input information. Thereafter, the attitude computer 15 feeds the calculated attitude $[_BC_I]_t$ back to the subcatalog edit unit 12 as indicated by the arrow.

Thus the satellite attitude decision system 5 corrects the attitude information of the satellite at a star observation time $(k-1)T$ obtained on the basis of star identification by the attitude variation within a time T from a time $(k-1)T$ calculated by the attitude displacement computer 14; therefore, the present attitude of the satellite at a time kT ($t_0=0$) is determined accurately.

Figure 5:
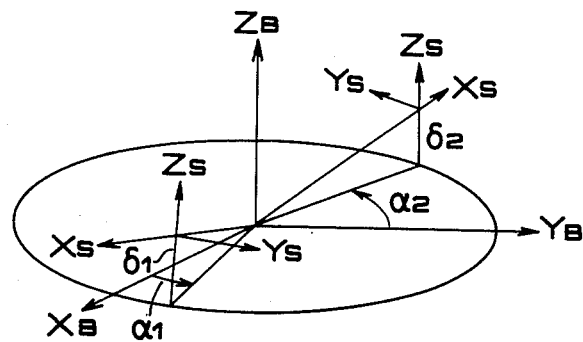
FIG. 5 is a diagram illustrating the relation between the star sensor coordinate axes and the satellite body coordinate axes.

FIG. 5 shows the relation between the star sensor coordinate system ($X_s$, $Y_s$, $Z_s$) and the satellite body coordinate system ($X_B$, $Y_B$, $Z_B$). In this embodiment, two sensors 3 are provided. The azimuths $\alpha$ and the elevations $\delta$ of the optical axes of the star sensors are ($\alpha_1$, $\delta_1$) and ($\alpha_2$, $\delta_2$) respectively. The coordinate conversion matrices $[_BC_S]_1$ and $[_BC_S]_2$ correlating the star sensor coordinates and the satellite body coordinates are expressed by the following equations:

$$[_BC_S]_1 = \begin{bmatrix} \cos\alpha_1 \cos\delta_1 & -\sin\alpha_1 & -\cos\alpha_1 \sin\delta_1 \\ \sin\alpha_1 \cos\delta_1 & \cos\alpha_1 & -\sin\alpha_1 \sin\delta_1 \\ \sin\delta_1 & 0 & \cos\delta_1 \end{bmatrix} \quad (1)$$

$$[_BC_S]_2 = \begin{bmatrix} -\sin\alpha_2 \cos\delta_2 & \cos\alpha_2 & \sin\alpha_2 \sin\delta_2 \\ \cos\alpha_2 \cos\delta_2 & -\sin\alpha_2 & -\cos\alpha_2 \sin\delta_2 \\ \sin\delta_2 & & \cos\delta_2 \end{bmatrix} \quad (2)$$

Figure 6:
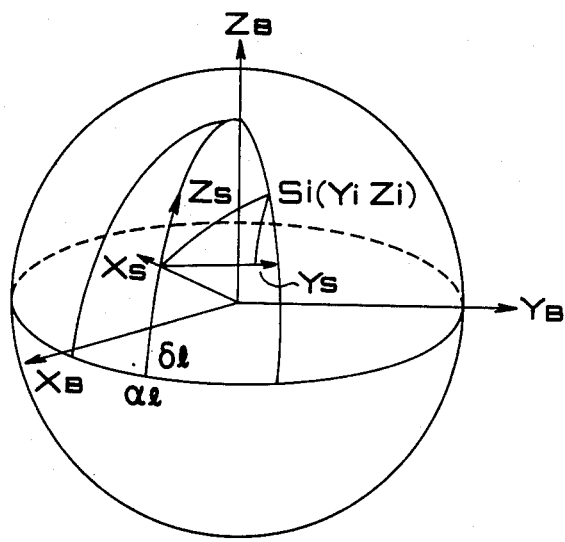
FIG. 6 is a drawing illustrating a set of coordinate axes of a star sensor for observing a fixed star.

FIG. 6 is a vector diagram showing the star-pointed unit vector $S_i(t)$ on the satellite body coordinate system.

In FIG. 6, $Y_i$ and $Z_i$ are the coordinates of a fixed star to be observed by the star sensor 3, while $\alpha_l$ and $\delta_l$ are the azimuth and the elevation of the optical axis of the star sensor of number l (l=1, 2).

In this arrangement, the star vector computer 10 calculates the star-pointed unit vector $S_i(t)$ on the satellite body coordinate system by the following equation:

$$S_i(t) = [_BC_S] \begin{bmatrix} \cos y_i \cos z_i \\ \sin y_i \cos z_i \\ \sin z_i \end{bmatrix} \quad (3)$$

where l=1 or 2 and i=1, 2 or 3.

In this embodiment, three observed values $S_1(t)$, $S_2(t)$ and $S_3(t)$ among two observed values from each star sensor 3 are selected and subjected to the following processing.

On the other hand, the subcatalog edit unit 12 edits subcatalogs $S_j^a$ in the following procedure by using $[_BC_I]_t$ (for the first processing, $[_BC_I]_0$ which has previously been set in the data base 11 is used) provided from the attitude computer 15.

Firstly, the unit vectors $i_{Sl}(t)$ along the direction of the optical axes of the star sensors 3 are calculated by the use of the following equation:

$$i_{Sl}(t) = [1,0,0][_SC_B]_l[_BC_l]_l \quad (4)$$

where $l = 1$ or 2.

Next, fixed stars $S_j^a$ expected to exist within the fields of view of the star sensors 3 are chosen from the star catalog $\overline{SS}^a$ contained in the data base 11 by the following conditional expression:

$$S_j^a(-[\overline{SS}^a]| \cos^{-1}\{\overline{SS}^a \cdot i_{Sl}\}| < \epsilon_1) \quad (5)$$

where $\epsilon_1$ is a fixed value determined selectively by taking into consideration the size of the fields of view of the star sensors.

The processor 13 executes the following processing procedure.

(1) The following identification processing is executed by using $S_i(t)$ ($i = 1$, 2 or 3) given by Equation (3) and the star catalogs $S_j^a$ given by equation (5).

$$\left. \begin{array}{l} a_1 = S_1(t) \cdot S_2(t) \\ a_2 = S_2(t) \cdot S_3(t) \\ a_3 = S_3(t) \cdot S_1(t) \end{array} \right\} \quad (6)$$

(2) One fixed star $S_1^a$ is fetched from the subcatalog and a test is carried out with the residual $j-1$ pieces of fixed stars for a preset fixed value $\epsilon_2$ to determine whether or not any combination satisfying the following inequality:

$$S_1^a \cdot S_{j-1}^a - a_i > \cos \epsilon_2 \quad (7)$$

wherein $i = 1$, 2 or 3.

(3) When any combination is found, the fixed star $S_1^a$ is reserved as a prospective fixed star for further identification.

(4) When no combination is found, the fixed star is eliminated from the subcatalog.

(5) The processes of (1) to (4) are repeated for the respective fixed stars contained in the subcatalog.

When $\epsilon_2$ is sufficiently small, combinations of fixed stars $S_1^a$, $S_2^a$; $S_2^a$, $S_3^a$; $S_3^a$, $S_1^a$ corresponding to $a_1$, $a_2$ and $a_3$ are left in the subcatalog after the above-mentioned processing. Accordingly, the identification processing is completed with a result that the catalogs of $S_1$, $S_2$ and $S_3$ are $S_1^a$, $S_2^a$ and $S_3^a$ respectively.

Figure 7:
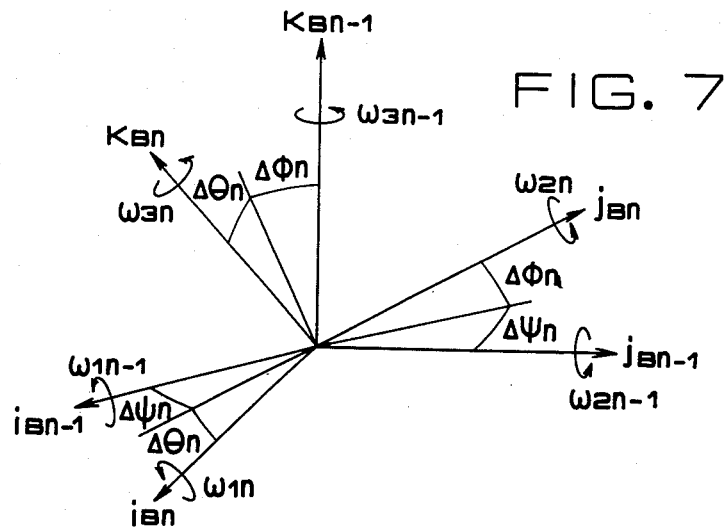
FIG. 7 is a diagram illustrating the relation between the preceding attitude and the present attitude of the satellite.

FIG. 7 shows the relative attitudes of the satellite at a time $(n-1)\tau$ and a time $n\tau$ when the time $t_0$ of star observation by the star sensors 3 set to zero, where $\tau$ is the sampling interval of star observation. In FIG. 7, $i_{Bn-1}$, $j_{Bn-1}$ and $k_{Bn-1}$ are unit vectors along the satellite body axes at the time $(n-1)\tau$, $i_{Bn}$, $j_{Bn}$ and $k_{Bn}$ are unit vectors along the satellite body axes at the time $n\tau$, $\Delta\Psi_n$, $\Delta\phi_n$ and $\Delta\theta_n$ are Eulerian angles, and $\omega_{1n-1}$, $\omega_{2n-1}$, $\omega_{3n-1}$, $\omega_{1n}$, $\omega_{2n}$ and $\omega_{3n}$ are angular velocities about the satellite body axes respectively.

Under these conditions, the attitude displacement computer 14 calculates the attitude variation $[\Delta C_B]$ between the time $t_0$ and the present time $t = n\tau$ by the use of the following equations:

$$[\Delta C_B] = \begin{bmatrix} \Delta\rho_1^2 - \Delta\rho_2^2 - \Delta\rho_3^2 + \Delta\rho_4^2 2(-\Delta\rho_4\Delta\rho_3 + \Delta\rho_1\Delta\rho_2) \\ 2(\Delta\rho_4\Delta\rho_2 + \Delta\rho_1\Delta\rho_2) \\ 2(\Delta\rho_4\Delta\rho_3 + \Delta\rho_1\Delta\rho_2) - \Delta\rho_1^2 + \Delta\rho_2^2 + \Delta\rho_3^2 + \Delta\rho_4^2 \\ 2(-\Delta\rho_4\Delta\rho_1 + \Delta\rho_2\Delta\rho_3) \\ 2(-\Delta\rho_4\Delta\rho_2 + \Delta\rho_1\Delta\rho_3)2(\Delta\rho_4\Delta\rho_1 + \Delta\rho_2\Delta\rho_3) \\ -\Delta\rho_1^1 - \Delta_2^2 + \Delta\rho_3^2 + \Delta\rho_4^2 \end{bmatrix} \quad (8)$$

where $$\begin{bmatrix} \Delta\rho_1 \\ \Delta\rho_2 \\ \Delta\rho_3 \\ \Delta\rho_4 \end{bmatrix}_n = \begin{bmatrix} \Delta q_4 & -\Delta q_3 & \Delta q_2 & \Delta q_1 \\ \Delta q_3 & \Delta q_4 & \Delta q_1 & \Delta q_2 \\ -\Delta q_2 & \Delta q_1 & \Delta q_4 & \Delta q_3 \\ -\Delta q_1 & -\Delta q_2 & -\Delta q_3 & \Delta q_4 \end{bmatrix} \begin{bmatrix} \Delta\rho_1 \\ \Delta\rho_2 \\ \Delta\rho_3 \\ \Delta\rho_4 \end{bmatrix}_{n-1} \quad (9)$$

$$\left. \begin{array}{l} \Delta q_1 = \sin\dfrac{\Delta\Theta_n}{2} \cos\dfrac{\Delta\Phi_n}{2} \sin\dfrac{\Delta\Psi_n}{2} - \cos\dfrac{\Delta\Theta_n}{2} \\ \quad \sin\dfrac{\Delta\Phi_n}{2} \cos\dfrac{\Delta\Psi_n}{2} \\ \Delta q_2 = -\sin\dfrac{\Delta\Theta_n}{2} \cos\dfrac{\Delta\Phi_n}{2} \cos\dfrac{\Delta\Psi_n}{2} - \cos\dfrac{\Delta\Theta_n}{2} \\ \quad \sin\dfrac{\Delta\Phi_n}{2} \sin\dfrac{\Delta\Psi_n}{2} \\ \Delta q_3 = \sin\dfrac{\Delta\Theta_n}{2} \cos\dfrac{\Delta\Phi_n}{2} \cos\dfrac{\Delta\Psi_n}{2} - \cos\dfrac{\Delta\Theta_n}{2} \\ \quad \cos\dfrac{\Delta\Phi_n}{2} \sin\dfrac{\Delta\Psi_n}{2} \\ \Delta q_4 = \cos\dfrac{\Delta\Theta_n}{2} \cos\dfrac{\Delta\Phi_n}{2} \cos\dfrac{\Delta\Psi_n}{2} - \sin\dfrac{\Delta\Theta_n}{2} \\ \quad \sin\dfrac{\Delta\Phi_n}{2} \sin\dfrac{\Delta\Psi_n}{2} \end{array} \right\} \quad (10)$$

In the equations shown above, the unknown quantities are Eulerian angles $(\Delta\theta, \Delta\phi$ and $\delta\Psi)_n$. The Eulerian angles are calculated by the use of the following equations with an assumption that the initial values of the Eulerian angles $\Delta\theta_0 = \Delta\phi_0 = \Delta\Psi_0 = 0$, while the angular velocities of rotation about the satellite body axes $\omega_{un}$ ($u = 1$, 2 or 3) measured by the sensor 4 are read at a sampling interval $\tau$ and following calculations are performed.

$$\left. \begin{array}{l} \Delta\Phi_n = \dfrac{d_1 + 2d_2 + 2d_3 + d_4}{6} \\ \Delta\Theta_n = \dfrac{\eta_1 + 2\eta_2 + 2\eta_3 + \eta_4}{6} \\ \Delta\Psi_n = \dfrac{f_1 + 2f_2 + 2f_3 + f_4}{6} \end{array} \right\} \quad (11)$$

where $$\begin{array}{l} d_1 = \tau\omega_{1n}, \\ \eta_1 = \tau\omega_{2n}, \\ f_1 = \tau\omega_{3n}, \end{array} \quad (12)$$

$$d_3 = \tau\left\{ \omega_{1n}\cos\dfrac{\omega_{2n}\tau}{2} + \omega_{3n}\sin\dfrac{\omega_{2n}\tau}{2} \right\},$$

$$\eta_2 = \tau\left\{ \omega_{1n}\tan\dfrac{\omega_{1n}\tau}{2} \sin\dfrac{\omega_{2n}\tau}{2} + \omega_{2n} - \right.$$

-continued $$\omega_{3n}\tan\frac{\omega_{1n}\tau}{2}\cos\frac{\omega_{2n}\tau}{2}\Bigg\},$$

$$f_2 = \tau\left\{\frac{-\omega_{1n}\sin\frac{\omega_{2n}\tau}{2}}{\cos\frac{\omega_{1n}\tau}{2}} + \frac{\omega_{3n}\cos\frac{\omega_{2n}\tau}{2}}{\cos\frac{\omega_{1n}\tau}{2}}\right\}$$

$$d_3 = \tau\left\{\omega_{1n}\cos\frac{\eta_2}{2} + \omega_{3n}\sin\frac{\eta_2}{2}\right\}$$

$$\eta_3 = \tau\left\{\omega_{1n}\tan\frac{d_2}{2}\sin\frac{\eta_2}{2} + \omega_{2n} - \omega_{3n}\tan\frac{d_2}{2}\cos\frac{\eta_2}{2}\right\}$$

$$f_3 = \tau\left\{\frac{-\omega_{1n}\sin\frac{\eta_2}{2}}{\cos\frac{d_2}{2}} + \frac{\omega_{3n}\cos\frac{\eta_2}{2}}{\cos\frac{d_2}{2}}\right\}$$

$$d_4 = \tau\{\omega_{1n}\cos\eta_3 + \omega_{3n}\sin\eta_3\}$$
$$\eta_4 = \tau\{\omega_{1n}\tan d_3\sin\eta_3 - \omega_{2n} + \omega_{3n}\tan d_3\cos\eta_3\}$$

$$f_4 = \tau\left\{-\omega_{1n}\frac{\sin\eta_3}{\cos d_3} + \omega_{3n}\frac{\cos\eta_3}{\cos d_3}\right\}$$

$$[\Delta p_1, \Delta p_2, \Delta p_3, \Delta p_4]_0^T = [0, 0, 0, 1]_0^T$$

Using with outputs $S_1$, $S_2$, $S_3$; $S_1{}^a$, $S_2{}^a$ and $S_3{}^a$ from the attitude computer 15, the attitude computer 15 first calculates the relation $[{}_BC_I]_{t=0}$ between the attitude of the satellite at a time $t=0$, namely, the satellite body coordinate system ($X_B$, $Y_B$, $Z_B$) and the reference attitude coordinate system, namely the inertial coordinate system ($X_I$, $Y_I$, $Z_I$) by the use of the following equation.

$$[{}_BC_I]_{t=0} = \begin{bmatrix} S_1 \\ S_2 \\ S_3 \end{bmatrix} [S_{1j}^a, S_{2j}^a, S_{3j}^a] \quad (13)$$

The results of Equations (8) and (13) are then used for calculating the present attitude $[{}_BC_I]_{t=n\tau}$ of the satellite, which is expressed by the following equation.

$$[{}_BC_I]_{t=n\tau} = [\Delta C_B][{}_BC_I]_{t=0} \quad (14)$$

Before the initial attitude is updated again at time T later, the attitude computer 15 calculates the attitude by the use of the following Equations (15) and (16) as employing the results of calculation of Equation (14) to be the initial value.

Now, the initial attitude value of the updating time $t=n\tau$ is assumed to be 0, then the attitude of the satellite $[i_B, j_B, k_B]_{tk}$ is expressed by the following equations.

$$[i_B, j_B, k_B]_{tk} = [{}_BC_I]_{tk}[i_I, j_I, k_I] \quad (15)$$

$$[{}_BC_I]_{tk} = [\Delta C_B][{}_BC_I]_{tk-1} \quad (16)$$

In calculating the equations (15) and (16), the result of Equation (14) is employed as $[{}_BC_I]_0$ wherein the $[\Delta C_B]$ is the one which is sequentially calculated such that the data $\omega_l$ ($l=1, 2,$ or 3) from the inertial sensors 4 are read at the time interval $\tau=t_k-t_{k-1}$ to calculate Eulerian angles $\Delta\phi$, $\Delta\delta$ and $\Delta\Psi$ by the use of Equations (11) and (12), then the Eulerian angles are substituted into Equation (9), (10) for further calculating Eulerian parameters ($\Delta p_1$, $\Delta p_2$, $\Delta p_3$, $\Delta p_4$,), which are finally substituted into the right side of Equation (8).

Referring now to the unit 7, wherein the estimated attitude computer 16 receives angular velocities $\delta(0)$ of rotation of the wheels from the actuator control circuit 9 and calculates the attitude $\hat{\theta}(t_f)$ and the attitude changing rate $\hat{\omega}(t_f)$ of the satellite at the end of each control interval $[0, t_f]$ i.e. time $t_f$ to provide them to the control parameter computer 17. Since the computer 6 provides an objective attitude $\theta°(t_f)$ to be established at the time $t_f$ and the changing rate $\omega°(t_f)$ thereof to the computer 17, it calculates from the attitude and the changing rate information $\theta(t_f)$, $\omega(t_f)$; $\theta°(t_f)$ and $\omega°(t_f)$ intermediate parameters $\lambda_1$ and $\lambda_2$ for determining control variables so that the sum of squares of voltages to be applied to the wheels become minimum to provide them to the control variable computer 18.

The computer 18 calculates from the parameters $\lambda_1$ and $\lambda_2$ wheel control variables $V_j$ ($j=1, 2, \ldots$ or m) for operating the wheels. Upon the reception of the control variables $V_j$, the actuator control circuit 9 further controls the angular velocities of rotation of the wheels to establish the objective attitude of the satellite as known.

Figure 8:
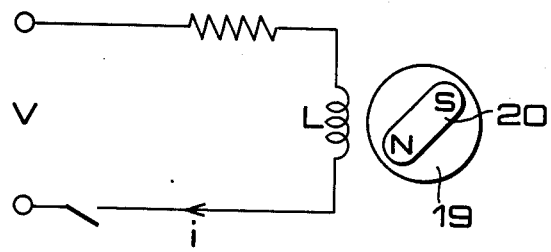
FIG. 8 is an equivalent circuit diagram of a DC brushless motor.

Now, the operation of the attitude control unit 7 will be described more concretely in connection with FIG. 8, wherein the wheel is shown as having a DC brushless motor driven by the actuator control circuit 9, for example, and there are also shown a voltage V to be applied to the motor, the resistance R of the winding of the motor, the inductance L of the same winding, an current i supplied to the same winding, the rotor 19 and a magnet 20 forming the rotor 19.

Figure 9:
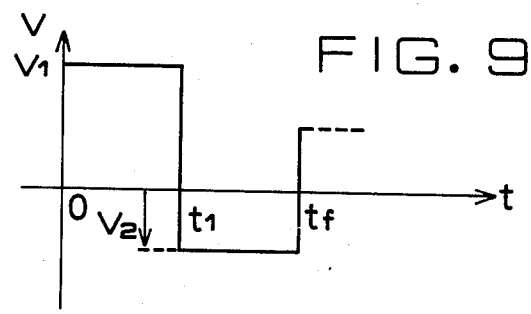
FIG. 9 is a diagram showing the waveform of control voltage to be applied to the motor of FIG. 8.

Assuming that each control interval $[0, t_f]$ is divided into m subintervals and the voltage V changes in steps by subintervals, as shown in FIG. 9, and yet the voltage within each subinterval is fixed, the control parameter computer 17 calculates, on the basis of the angular velocity $\delta(0)$ of rotation of the wheel at a time $t_0$, the values of parameters $a_j$ and $b_j$ ($j=1, 2, \ldots$ or m) and $\Omega_1$ and $\Omega_2$ that determines the conditions of the estimated attitude $\hat{\theta}(t_f)$ and $\hat{\omega}(t_f)$ at the time $t_f$, by the use of the following equations.

$$\hat{\omega}(t_f) = a_1V_1 + a_2V_2 + \ldots + a_mV_m + \Omega_1 \quad (17)$$

$$\hat{\theta}(t_f) = b_1V_1 + b_2V_2 + \ldots + b_mV_m + \Omega_2 \quad (18)$$

$$\left.\begin{array}{l} a_1 = -\mu\frac{C_2}{C_1}[1 - e^{-c_1 t_1}] \\ a_j = -\mu\frac{C_2}{C_1}e^{-c_1 t_{j-1}}[1 - e^{-c_1(t_j - t_{j-1})}] \end{array}\right\} \quad (19)$$

where $j=1, 2, \ldots$ or m $$\Omega_1 = -\mu e^{-c_1 t_m}\delta(0) + f(t_f) \quad (20)$$

$$\left.\begin{array}{l} b_1 = -\mu(C_2/C_1{}^2)[C_1 t_1 - (1 - e^{-c_1 t_1})] \\ b_j = -\mu(C_2/C_1{}^2)[C_1(t_j - t_{j-1}) - e^{-c_1 t_{j-1}} \\ \quad (1 - e^{-c_1(t_j - t_{j-1})})] \end{array}\right\} \quad (21)$$

where $j=1, 2, \ldots$ or m $$\Omega_2 = -\mu\frac{1}{C_1}[1 - e^{-c_1 t_f}]\delta(0) + F(t_f) \quad (22)$$

-continued $$C_1 = \frac{K_1 K_2}{R I_F}, \quad C_2 = \frac{K_2}{R T_f}, \quad \mu = \frac{I_f}{I_y} \quad (23)$$

where
$I_f$=the inertial moment of the wheel,
$K_1$=counter electromotive force,
$K_2$=torque constant,
$I_y$=the inertial moment of the satellite about the body axis $Y_B$, and
$f(t_f)$=the time integral of external torque disturbance.

$$F(t_f) = \int_0^{t_f} f(\tau)d\tau \quad (24)$$

$$\mu = \frac{I_f}{I_y} \quad (25)$$

The calculating unit 6 which is arranged to generate a respective function for controlling object provides outputs of the objective attitude $\theta°(t_f)$ and the changing rate $\omega°(t_f)$ thereof to be established at the end of each control interval $[0, t_f]$.

The computer 17 performs operations on the following equations by use of values obtained through the calculation of Equations (19) to (25) and $\omega°(t_f)$ and $\theta°(t_f)$ to provide intermediate control parameters $\lambda_1$ and $\lambda_2$.

$$\lambda_1 = -2\{(\omega_y°(t_f) - \Omega_1)b_1^2 + b_2^2 + \ldots + (b_m^2) - \quad (26)$$

$$(\theta_y°(t_f) - \Omega_2)(a_1 b_1 + a_2 b_2 + \ldots + a_m b_m)\}/\{(a_1^2 + a_2^2 + \ldots + a_m^2)(b_1^2 + b_2^2 + \ldots + b_m^2) - (a_1 b_1 + a_2 b_2 + \ldots + a_m b_m)^2\}$$

$$\lambda_2 = 2\{(\omega_y°(t_f) - \Omega_1)(a_1 b_1 + a_2 b_2 + \ldots + a_m b_m) - \quad (27)$$

$$(\theta_y°(t_f) - \Omega_2)(a_1^2 + a_2^2 + \ldots + a_m^2)\}/\{(a_1^2 + a_2^2 + \ldots + a_m^2)(b_1^2 + b_2^2 + \ldots + b_m^2) - (a_1 b_1 + a_2 b_2 + \ldots + a_m b_m)^2\}$$

The control variable computer 18 receives the values of $\lambda_1$ and $\lambda_2$ calculated by Equations (26) and (27) and calculates $V_j$ by the use of the following equation.

$$V_j = -\tfrac{1}{2}(\lambda_1 a_j + \lambda_2 b_j) \quad (28)$$

where $J = 1, 2, \ldots$ or $m$.

The values of $V_j$ are those satisfying Equations (17) and (18) and also minimizing the sum F of squares of $V_j$, namely, $$F = V_1^2 + V_2^2 + \ldots + V_m^2 \quad (29)$$

A qualification to minimize the sum of squares of $V_j$ is expressed as;

$$F = \sum_{j=1}^{m} V_j^2 + \lambda_1 \left( \sum_{j=1}^{m} a_j V_j + \Omega_1 - \omega°(t_f) \right) + \lambda_2 \left( \sum_{j=1}^{m} b_j V_j + \Omega_2 - \theta°(t_f) \right) \quad (30)$$

Thus the conditions to minimize the sum of square of $F_j$ are derived from the followings:

$$\left. \begin{array}{l} \frac{\partial F}{\partial V_j} = 0 \\ \text{where } j = 1, 2, \ldots \text{ or } m \\ \frac{\partial F}{\partial \lambda_i} = 0 \end{array} \right\} \quad (31)$$

where $i = 1$ or 2.

Equations (17) to (31) have been explained as formulas for calculating manipulated variables for controlling one of the wheels. However it will be understood that equations for calculating the manipulated variables for controlling the rest of the wheels arranged on the other two axes may also be provided in the same procedure as explained above.

Figure 10:
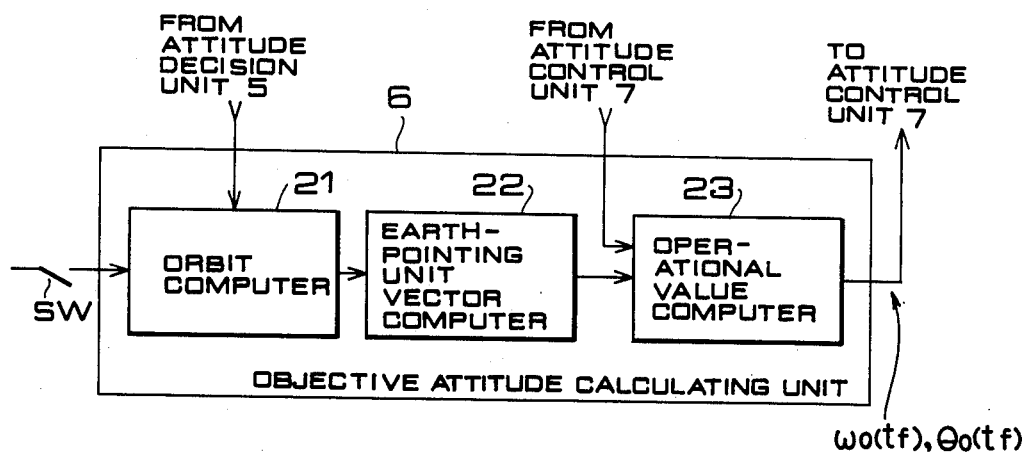
FIG. 10 is a functional block diagram of the objective attitude calculating unit shown in FIG. 3.

Lastly, the functions of the objective attitude calculating unit 6 will be described in reference with FIG. 10 on an assumption that the present satellite is a three-axis earth center pointing geostationary type. The unit 6 has an orbit computer 21 which receives orbit information sent periodically as ground command from a ground station and signals sent from the control variable computer 18 for calculating the estimated values of the position vector and velocity vectors of the satellite at a specified time. An earth-oriented unit vector calculating computer 22 receives the estimated values from the computer 21 for calculating the unit vector directed from the satellite to the center of the earth. An operational value computer 23 receives the signals given by the computers 15 and 22 and calculates the values of $\omega_0(t_f)$ and $\theta_0(t_f)$ by the use of Equations (17) and (18).

Figure 11:
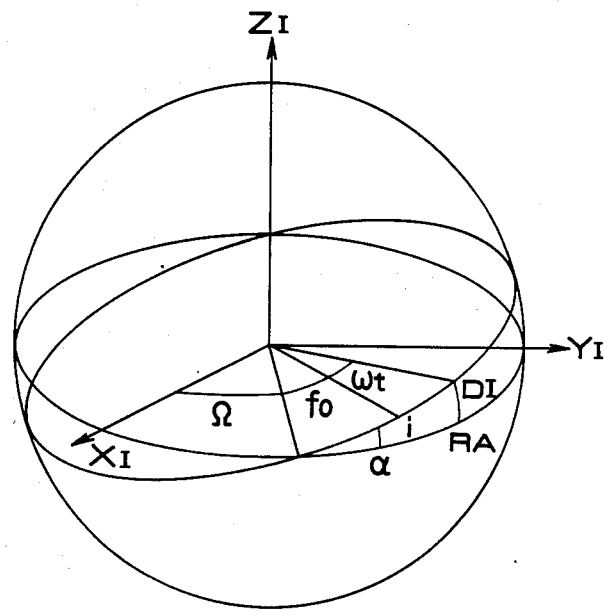
FIG. 11 is a diagram showing a coordinate system for calculating the position of the satellite.

FIG. 11 is a vector diagram for calculating the position of a geostationary satellite. If assumption is made that the orbit information received from the ground station includes the right-ascension ascending node $\Omega$, orbit inclination i, period T and an ascending node leave angle $f_0$, the position (RA, DI) of the satellite at a time t after the reference time $t_0$ is expressed by the following equations.

$$\sin DI = \sin i \cdot \sin \omega t \quad (32)$$

where $\omega = 2\pi/T$ $$RA = \Omega + \alpha \quad (33)$$

where $$\cos \alpha = \frac{\cos \omega t}{\cos DI}$$

The unit vector e directed from the center of the satellite to the center of the earth is calculated by the following equation (34) by substituting the values of RA and DI given by equations (32) and (33).

$$e = \begin{bmatrix} \cos(-DI)\cos(RAS + 180°) \\ \cos(-DI)\sin(RAS + 180°) \\ \sin(-DI) \end{bmatrix} \quad (34)$$

In controlling the attitude of the satellite to direct, for example, the body axis $Y_B$ to the center of the earth, the objective attitude is given by the following equations, in which the attitude information at the present time $t = t_k$ given by equation (15) and the unit vector at a time $t_f = t_k + \tau$ are used.

$\theta°_x(t_f)$, $\omega°_x(t_f)$ of the satellite with respect to the axis $X_B$ is calculated by, $$\left. \begin{array}{l} \cos\theta°_x(t_f) = j_B \cdot e/\cos[\pi/2 \cdot \cos^{-1}(j_B \cdot e)] \\ \omega°_x(t_f) = 0.0°/\text{sec} \end{array} \right\} \quad (35)$$

and $\theta°_z(t_f)$, $\omega°_z(t_f)$ of the satellite with respect to the axis $Z_B$ is calculated by, $$\left. \begin{array}{l} \theta°_z(t_f) = \pi/2 - \cos^{-1}(j_B \cdot e) \\ \omega°_z(t_f) = 2\pi/T \end{array} \right\} \quad (36)$$

Figure 1A:
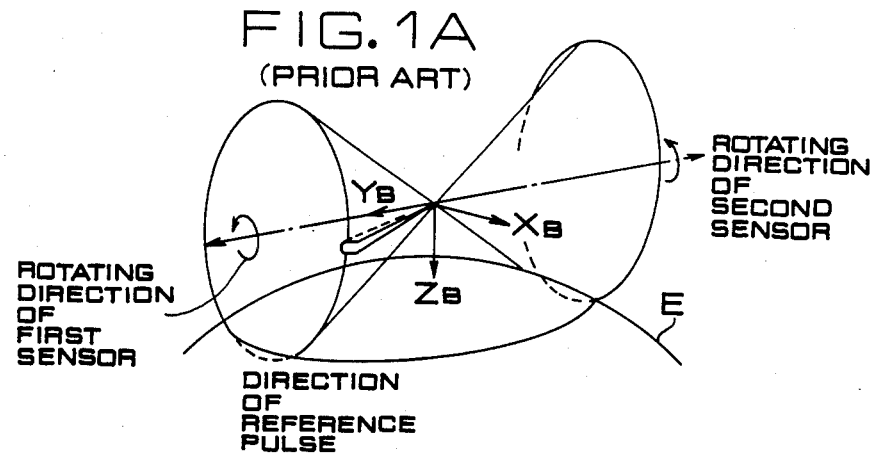
FIG. 1A is a diagram illustrating the disposition of the coordinate system of a satellite provided with sensors of prior art.
Figures 1B, 1C, 1D:
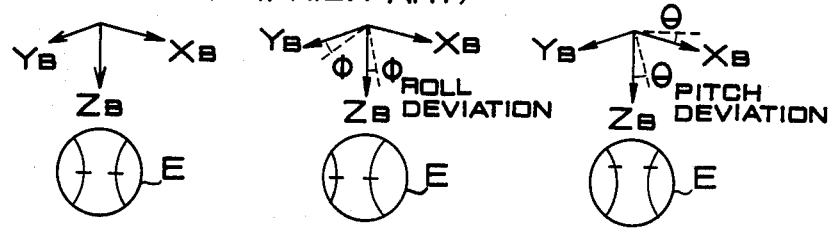
FIGS. 1B to 1D are diagrams illustrating the position of the axes of the coordinate system of the earth sensors of FIG. 1A relative to the earth.
Figure 12:
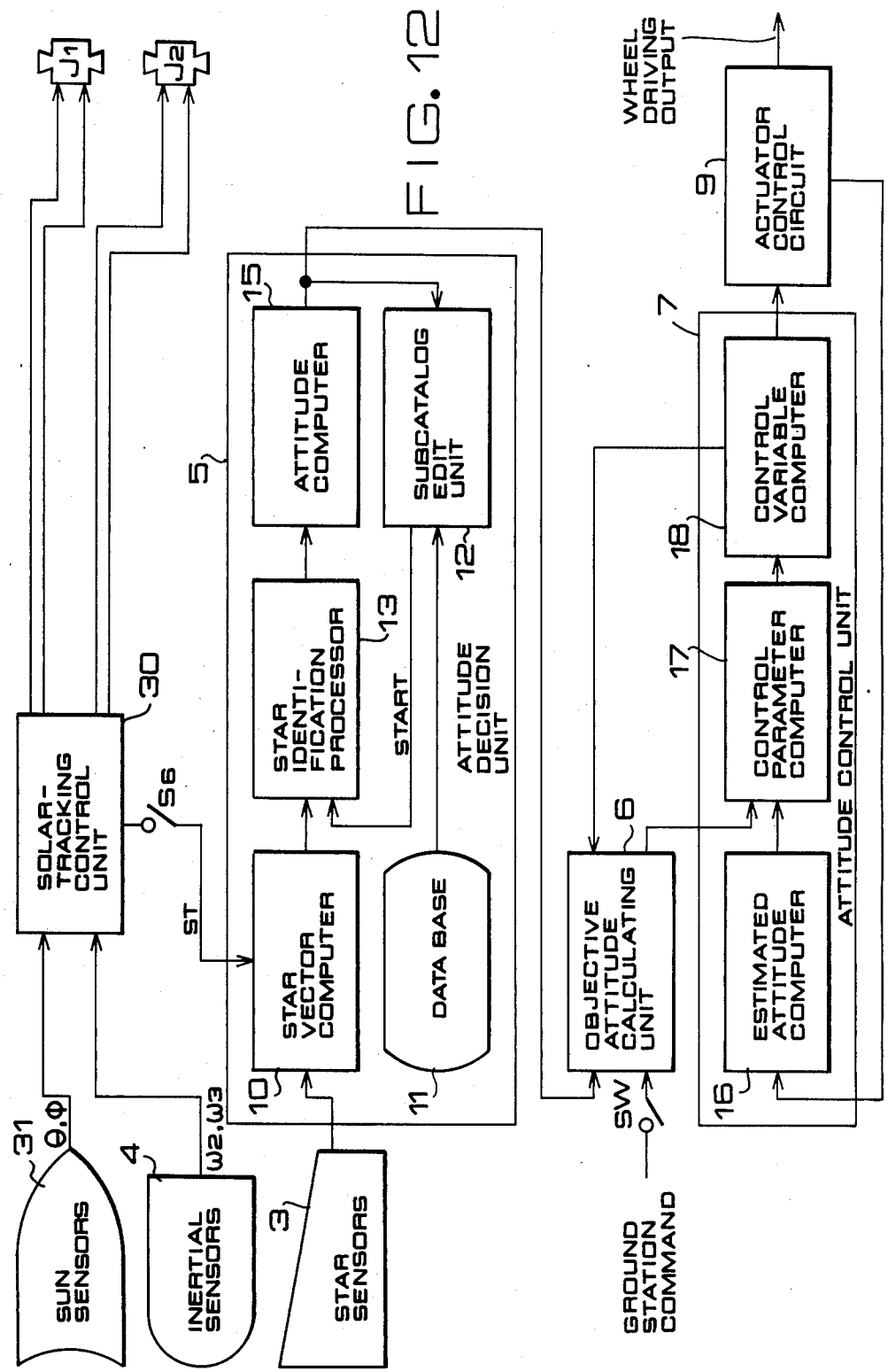
FIG. 12 is a block diagram showing the constitution of a second embodiment of the satellite attitude control system according to the present invention.
Figure 13:
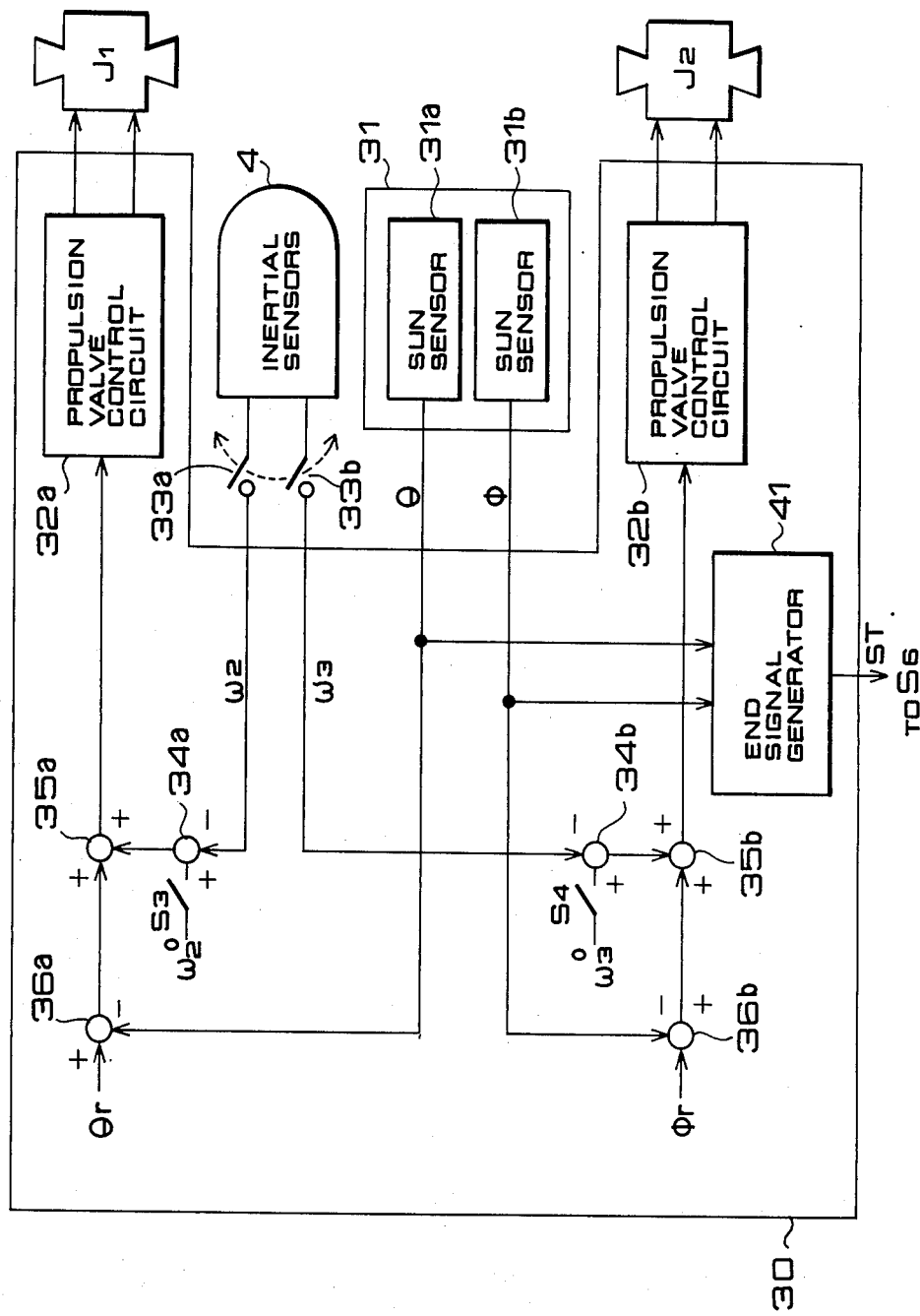
FIG. 13 is a block diagram showing the constitution of the sun tracking control unit of FIG. 12.

FIG. 12 is a block diagram of a second embodiment of the present invention, in which the control system shown in FIG. 1 is additionally equipped with a sun-tracking control unit 30 and in which the unit 30 has an arrangement as shown in FIG. 13 adapted to receive the output signals from a sun sensing system 31. The system 31 comprises a pair of sensors 31a and 31b disposed along planes $X_B$-$Z_B$ and $Y_N$-$Z_B$ respectively as shown in FIG. 15.

Referring to FIG. 13, if the sensors 31a and 31b are not detecting the sun, propulsion valve control circuits 32a and 32b receive the deviations $(\omega_2° - \omega_2)$ and $(\omega_3° - \omega_3)$, which are derived from measured angular velocity $\omega_2$ and $\omega_3$ about the body axis $Y_B$ and $Z_B$ of the satellite from the inertial sensors 4 through switches 33a and 33b, comparators 34a and 34b and adders 35a and 35b, and the predetermined values $\omega_2°$ and $\omega_3°$ respectively for actuating gas jets $J_1$ and $J_2$ to rotate the satellite 1 about the body axes $Y_B$ and $Z_B$ at angular velocities $\omega_2°$ and $\omega_3°$ respectively so that the deviations are minimized. After the satellite has been brought, by the agency of the gas jets $J_1$ and $J_2$, to an attitude where the sun sensors 31a and 31b are allowed to detect the sun, the propulsion valve control circuit 32a opens the switch 33a and actuates the gas jet $J_1$ until the angle $\theta$, as shown in FIG. 15, coincides substantially with the set angle $\theta_r$, as shown in FIG. 13, wherein the angle $(90° - \theta)$ between the body axis $Z_B$ and a sun-pointing direction $S_s$ observed by the sun sensor 31a is provided thereto via the comparator 36a. Similarly, the propulsion valve control circuit 32b which opens the switch 33b upon the detection of the sun by the sensor 31b, receives the angle $(90° - \phi)$ between the body axis $Y_B$ and the unit vector $S_s$ directed to the sun, wherein the angle $\phi$ is provided from the sun sensor 31b via the comparator 36b for actuating the gas jet $J_2$ until the angle $\phi$ coincides substantially with the set angle $\phi_r$.

Figure 15:
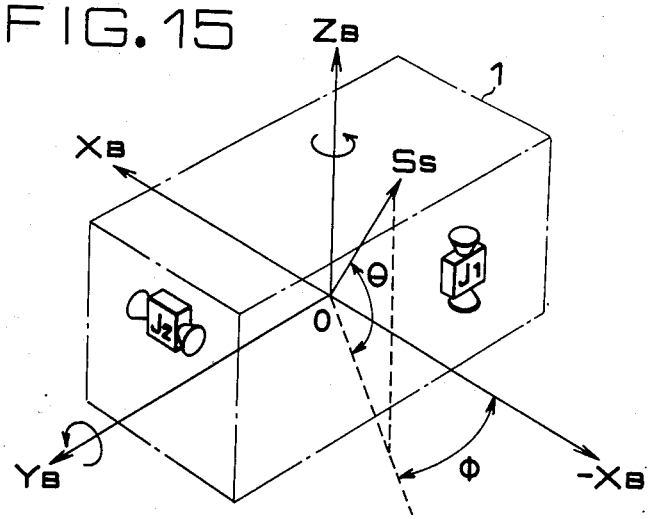
FIG. 15 is a diagram illustrating the coordinate system of the sun sensor of FIG. 12.
Figure 16:
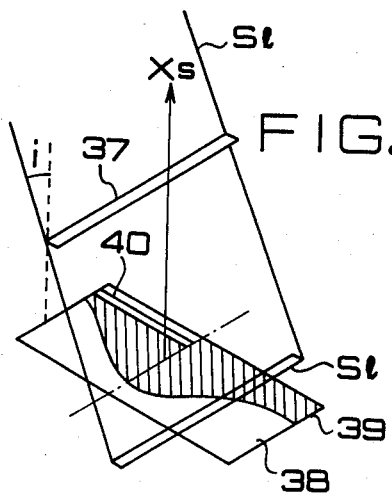
FIG. 16 is a schematic view showing the general construction of the sun sensor of FIG. 12.

FIG. 15 is a vector diagram showing the relation between the body axes ($X_B$, $Y_B$, $Z_B$) and the sun-directed unit vector $S_s$ and FIG. 16 is a schematic illustration showing the general arrangement of the sun sensors 31a and 31b. The sunlight $S_l$ passed through a slit 37 irradiates a solar cell element 38 which has a screening mask 39 of a shape which allows output of it to vary in accordance with the incident angle i of the sunlight $S_l$ to the cell element. Therefore, the angles i between the sun sensors 31a and 31b and the sun-pointing direction $S_s$ are represented by the output from the cell element 38. The control circuits 32a and 32b decide the incident angle i, namely, the positive or negative polarity of the signals $\theta$ and $\phi$ respectively, on the basis of information whether or not there is output of cell element 40 which is located on one half area of the mask 39.

Upon the detection of the sensor signals $\theta$ and $\phi$ having reduced approximately to zero and this state being stabilized, an end signal generator 41 generates a start signal ST for a star identifying process for providing it via a switch S6 to computer 10, and then opens the switch S6 to disable the operation of the control circuits 32a and 32b.

Figure 17:
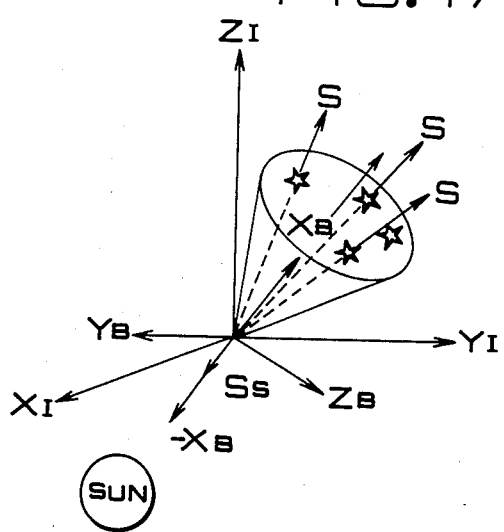
FIG. 17 is a diagram illustrating coordinate systems for explaining the concept of star observation.

FIG. 17 shows the coordinate of a star sensor 31 attached to the satellite, wherein the body axis $-X_B$ thereof is directed to the sun before the direction of the optical axis $X_S$ thereof coincides with the direction of the body axis $X_B$. Since it is known that the sun-pointing unit vector S on an inertial coordinate system ($X_I$, $Y_I$, $Z_I$) as a reference attitude can readily be calculated by the use of an ephemeris, the direction of the optical axis $X_S$ of the star sensor can previously be obtainable the launching data of the satellite is decided. Accordingly, taking into consideration the size of the field of view of the star sensor and the setting error in the direction of the body axis $-X_B$ relative to the sun-pointing direction the catalog of a subjective star to be observed by the star sensor can be stored beforehand in the star data base 11.

Figure 14:
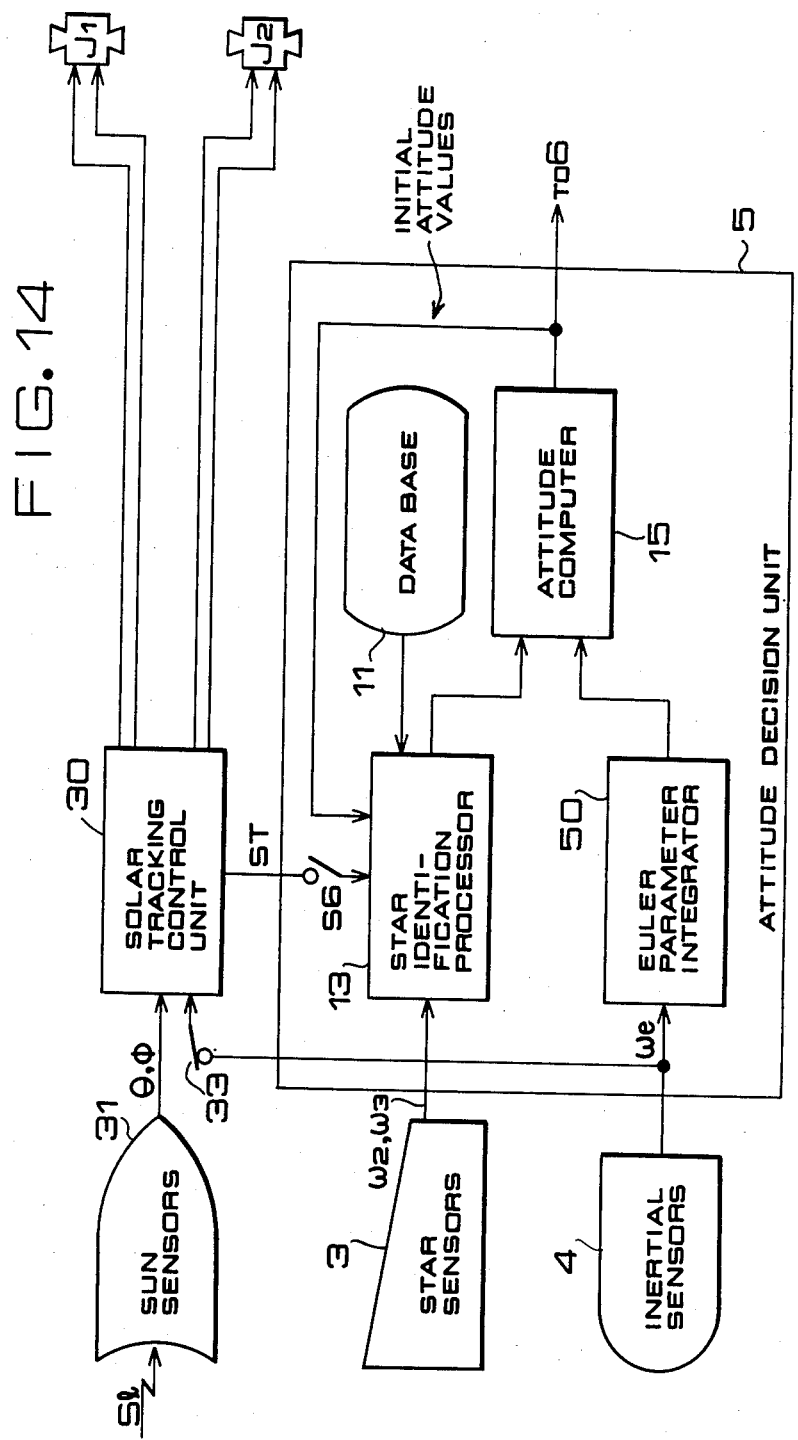
FIG. 14 is a block diagram showing an arrangement of a satellite attitude control system as a reference of the present invention.

FIG. 14 is a block diagram of an artificial satellite attitude control system which is shown here as an reference of the present invention, wherein the same reference numbers with that of FIG. 12 respectively indicate the same parts so that the following description will particularly be made to those parts having different number thereof.

The star identification processor 13 receives an observed coordinates ($Y_i$, $Z_i$) (i=the number of an observed fixed star within the field of view of the star sensor 3 obtained therefrom) and a star catalog $S_j^a$ (j=the catalog number of an accessed star from the data base 11) for deciding a catalog star $S_{ij}^a$ corresponding to the observed star. On the other hand, an Euler parameter integrating computer 50 receives a measured angle of rotation $\omega_e$ about the body axis, given by the inertial sensors 4 and calculates the relative attitude variation since the star observation took place by the star sensor 3.

The computer 15 receives signals from the processor 13 and the computer 14 for deciding the attitude of the satellite, which is used as an initial value for the next sequential decision of the attitude in a known manner.

When the attitude computer 15 updates the initial attitude values periodically on the basis of signals given by the star sensor 3, the output signal of the computer 15 is fed back to the star identification processor 13 to limit the star catalog data read area in the data base 11 to be collated so that data reading is executed efficiently. Consequently, the processor 13 is capable of reducing the required time for star identification processing.

What is claimed is:

1. A system for controlling an artificial attitude of a satellite and changing rate thereof on the basis of detected signals from inertial sensors for detecting angular velocities of rotation of the satellite about the body axes thereof and star sensors for detecting incident light from fixed stars so as to coincide with an objective attitude, comprising:

a first means for deciding the present attitude of the satellite with respect to said body axes on the basis of said signals from said sensors to provide positional information for indicating present position of the satellite;

a second means for deciding an objective attitude of the satellite to be established, on the basis of orbit information received from a ground station and said positional information to provide an objective attitude information indicating the objective attitude;

a third means for calculating required operation values for controlling the attitude on the basis of said objective attitude information, said values being fed to actuators for controlling the attitude of the satellite;

said first means including:

means to calculate a unit vector representing the direction of an observed fixed star on the body coordinate of the satellite, on the basis of the detected signals from said star sensors;

memory means for storing an initial estimated attitude information of the satellite and catalog information representing the spatial coordinates of fixed stars;

edit means for reading the attitude information and catalog information from the memory means to edit a catalog of stars expected to be observed within the ranges of the field of view of the star sensors;

means for identifying a catalog star corresponding to the observed fixed star, on the basis of said unit vector and said catalog; and means for calculating the present attitude of the satellite on the basis of said catalog star from said identifying means and the detected signals from the inertial sensor to provide the information of the present attitude of the satellite.

2. The system according to claim 1, wherein said edit means repeat operation of editing of the catalog on the basis of present attitude information.

3. The system according to claim 1, wherein said third means comprises:

means for calculating an estimated attitude of the satellite at the end of a predetermined time interval to control the attitude of the satellite, on the basis of angular velocities of rotation of wheels at the initial time of said predetermined time interval;

means for generating control parameters which allow to minimize the sum of squares of required operational values for controlling the satellite, on the basis of said objective attitude information from said second means and said estimated attitude of the satellite; and means for generating said operational values by the use of said control parameters.

4. A system for controlling an attitude of an artificial satellite and attitude changing rate thereof on the basis of detected signals from inertial sensors for detecting angular velocities of rotation of the satellite about the body axes thereof, star sensors for detecting incident light from fixed stars and sun sensors for detecting sunlight so as to coincide with an objective attitude, comprising:

control means for controlling gas jets on the basis of an angle between a predetermined body axis and a solar pointing direction provided with sense signal from the sun sensor and angular velocity of rotation of the satellite about the body axis provided with sense signal from the inertial sensor to control the attitude of the satellite so that the body axis coincides with the sun-pointing direction, and to generate a sun-tracking completion signal when it is decided that the body axis of the satellite coincides with the solar pointing direction;

a first means for deciding the present attitude of the satellite with respect to predetermined body axes on the basis of detected signals from the star sensors to generate positional information indicating the present attitude of the satellite upon the reception of the sun-tracking completion signal;

a second means for deciding an attitude of the satellite to be established, on the basis of orbit information received from a ground station and said position information to provide an objective attitude information indicating the attitude to be established;

a third means for calculating operational values to control the attitude on the basis of said objective attitude information, said values being provided to actuators for controlling the attitude of the satellite;

said first means comprising:

means for calculating a unit vector representing the direction of an observed fixed star on the body coordinate system of the satellite, on the basis of the sense signals from the star sensors;

memory means for storing an initial estimated attitude information of the satellite and catalog information representing the spatial coordinates of fixed stars;

edit means for reading the attitude information and catalog information from the memory means and to edit a catalog of stars expected to be observed within the ranges of the field of view of the star sensors;

means for identifying a catalog star corresponding to the observed fixed star, on the basis of said unit vector and said catalog; and means for calculating the present attitude of the satellite on the basis of said catalog star from said identifying means to provide the information of the present attitude of the satellite.

5. The system according to claim 4, wherein said edit means repeat operation of editing of the catalog on the basis of present attitude information.

6. The system according to claim 4, wherein said third means comprises:

means for calculating an estimated attitude of the satellite at the end of a predetermined time interval to control the attitude of the satellite, on the basis of angular velocities of rotation of wheels at the initial time of said predetermined time interval;

means for generating control parameters which allow to minimize the sum of squares of required operational values for controlling the satellite, on the basis of said objective attitude information from said second means and said estimated attitude of the satellite; and means for generating said operational values by the use of said control parameters.

7. A system for controlling an attitude of an artificial satellite and attitude changing rate thereof on the basis of detected signals from inertial sensors for detecting angular velocities of rotation of the satellite about the body axes thereof, star sensors for detecting incident light from fixed stars and sun sensors for detecting sunlight so as to coincide with an objective attitude, comprising:

control means for controlling gas jets on the basis of an angle between a predetermined body axis and a solar pointing direction provided with sense signal from the sun sensor and angular velocity of rotation of the satellite about the body axis provided with sense signal from the inertial sensor to control the attitude of the satellite so that the body axis coincides with the sun-pointing direction, and to generate a sun-tracking completion signal when it is decided that the body axis of the satellite coincides with the solar pointing direction;

a first means for deciding the present attitude of the satellite with respect to predetermined body axes on the basis of detected signals from the star sensors to generate positional information indicating the present attitude of the satellite upon the reception of the sun-tracking completion signal;

a second means for deciding an attitude of the satellite to be established, on the basis of orbit information received from a ground station and said position information to provide an objective attitude information indicating the attitude to be established;

a third means for calculating operational values to control the attitude on the basis of said objective attitude information, said values being provided to actuators for controlling the attitude of the satellite;

said first means comprising:

memory means for storing initial estimated attitude information and catalog information representing the space coordinates of fixed stars;

means for identifying the catalog star corresponding to the observed fixed star, on the basis of attitude information and catalog information from said memory means, and observed coordinates of the star measured by the star sensors;

means for calculating relative attitude variation of the satellite, on the basis of angular velocities of rotation about the body axis measured by the inertial sensor;

means for calculating the present attitude of the satellite on the basis of said attitude variation and said identified catalog star to provide present attitude information.

* * * * *

UNITED STATES PATENT AND TRADEMARK OFFICE
CERTIFICATE OF CORRECTION

PATENT NO. : 4,617,634

DATED : October 14, 1986

INVENTOR(S) : Kiichiro Izumida and Ritaroh Kasai

It is certified that error appears in the above-identified patent and that said Letters Patent is hereby corrected as shown below:

Column 1, line 46, "sensor" should be --sensors--.

Column 3, line 52, after the word "computer" (first occurrence) insert --14--.

Column 6, line 10, after "$\Delta$" (second occurrence) insert --$\rho$--.

Column 9, line 67, "square" should be --squares--.

Signed and Sealed this

Twenty-fourth Day of February, 1987

*Attest:*

DONALD J. QUIGG

*Attesting Officer*      *Commissioner of Patents and Trademarks*